US012030749B2

(12) United States Patent
Fukumori et al.

(10) Patent No.: US 12,030,749 B2
(45) Date of Patent: Jul. 9, 2024

(54) INFORMING DEVICE, WORK VEHICLE, AND INFORMING METHOD

(71) Applicant: TADANO LTD., Kagawa (JP)

(72) Inventors: Yasuhiro Fukumori, Kagawa (JP); Naoto Kawabuchi, Kagawa (JP); Naofumi Yoshida, Kagawa (JP); Masato Miyoshi, Kagawa (JP); Kei Ohara, Kagawa (JP); Hidenobu Takahashi, Kagawa (JP); Reya Nagata, Kagawa (JP); Masafumi Takahashi, Kagawa (JP)

(73) Assignee: TADANO LTD., Kagawa (JP)

( * ) Notice: Subject to any disclaimer, the term of this patent is extended or adjusted under 35 U.S.C. 154(b) by 674 days.

(21) Appl. No.: 17/260,427

(22) PCT Filed: Jul. 23, 2019

(86) PCT No.: PCT/JP2019/028738
§ 371 (c)(1),
(2) Date: Jan. 14, 2021

(87) PCT Pub. No.: WO2020/022297
PCT Pub. Date: Jan. 30, 2020

(65) Prior Publication Data

US 2021/0261387 A1 Aug. 26, 2021

(30) Foreign Application Priority Data

Jul. 25, 2018 (JP) ................................ 2018-138950

(51) Int. Cl.
*B66C 13/00* (2006.01)
*B66C 13/56* (2006.01)
(Continued)

(52) U.S. Cl.
CPC .............. *B66C 13/00* (2013.01); *B66C 13/56* (2013.01); *B66C 23/18* (2013.01); *E02F 9/121* (2013.01); *E02F 9/267* (2013.01)

(58) Field of Classification Search
CPC ......... B66C 13/00; B66C 13/56; B66C 23/18; E02F 9/121; E02F 9/267
(Continued)

(56) References Cited

U.S. PATENT DOCUMENTS 6,170,681 B1 1/2001 Yoshimatsu
2007/0216331 A1 * 9/2007 Morinaga ............ E02F 9/2075 318/561
(Continued)

FOREIGN PATENT DOCUMENTS

EP 0614845 A2 9/1994
EP 2578757 A1 4/2013
(Continued)

OTHER PUBLICATIONS

Oct. 8, 2019, International Search Report issued for related PCT Application No. PCT/JP2019/028738.
(Continued)

*Primary Examiner* — Krishnan Ramesh
(74) *Attorney, Agent, or Firm* — Paratus Law Group, PLLC

(57) ABSTRACT

An informing device is an informing device mounted on a work vehicle that includes a lower base body, and a swivel body swivelably provided at the lower base body. The informing device includes a first detection unit that detects the actual amount of rotation of a drive device which swivels the swivel body or a driven part driven by the drive device, and a notification unit that issues a notification regarding information corresponding to the amount of rotation detected by the first detection unit.

8 Claims, 4 Drawing Sheets

(51) Int. Cl.
*B66C 23/18* (2006.01)
*E02F 9/12* (2006.01)
*E02F 9/26* (2006.01)

(58) Field of Classification Search
USPC .......................................................... 701/34.2
See application file for complete search history.

(56) References Cited

U.S. PATENT DOCUMENTS

| | | | | |
|---|---|---|---|---|
| 2013/0066527 | A1 | 3/2013 | Mizuochi et al. | |
| 2014/0111648 | A1* | 4/2014 | Ishimoto | B60R 1/28 348/148 |
| 2014/0297106 | A1 | 10/2014 | Magaki et al. | |
| 2015/0163212 | A1* | 6/2015 | Saegusa | G07C 5/008 726/28 |
| 2019/0277004 | A1* | 9/2019 | Hashimoto | G01B 11/00 |
| 2019/0360178 | A1* | 11/2019 | Morimoto | E02F 9/20 |
| 2020/0399863 | A1* | 12/2020 | Aizawa | B60R 11/02 |
| 2021/0002856 | A1* | 1/2021 | Harshman | E02F 3/764 |
| 2021/0025237 | A1* | 1/2021 | Sj?Holm | E21B 7/025 |
| 2021/0054597 | A1* | 2/2021 | Ueda | E02F 9/205 |

FOREIGN PATENT DOCUMENTS

| | | | |
|---|---|---|---|
| EP | 2784228 | B1 | 10/2014 |
| JP | S57-158540 | U | 10/1982 |
| JP | S60-133131 | A | 7/1985 |
| JP | H07-040866 | A | 2/1995 |
| JP | H08-026676 | A | 1/1996 |
| JP | H11-336132 | A | 12/1999 |
| JP | 2016-175745 | A | 10/2016 |

OTHER PUBLICATIONS

Oct. 8, 2019, International Search Opinion issued for related PCT Application No. PCT/JP2019/028738.

May 25, 2022, European Search Report issued for EP Application No. 19841431.0.

* cited by examiner

| OPERATION DIRECTION DATA | DIRECTION IN WHICH MOTOR IS TO ROTATE |
|---|---|
| FORWARD | FORWARD ROTATION DIRECTION |
| BACKWARD | REVERSE ROTATION DIRECTION |
| NO DIRECTION | NO DIRECTION |

41

INFORMING DEVICE, WORK VEHICLE, AND INFORMING METHOD

CROSS REFERENCE TO PRIOR APPLICATION

This application is a National Stage Patent Application of PCT International Patent Application No. PCT/JP2019/028738 (filed on Jul. 23, 2019) under 35 U.S.C. § 371, which claims priority to Japanese Patent Application No. 2018-138950 (filed on Jul. 25, 2018), which are all hereby incorporated by reference in their entirety.

TECHNICAL FIELD

The present invention relates to an informing device, a work vehicle, and an informing method.

BACKGROUND ART

In the related art, a crane including a swivel angle detector for detecting the amount of swiveling and a position of a swivel body has been known as an example of a work vehicle. For example, Patent Literature 1 and Patent Literature 2 disclose a crane having a potentiometer as the swiveling angle detector.

CITATION LIST

Patent Literature

Patent Literature 1: JP 8-26676 A
Patent Literature 2: JP 2016-175745 A

SUMMARY OF THE INVENTION

Problems to be Solved by the Invention

Incidentally, a crane in which an operation of the swivel body is achieved by an operation of a bleed-off circuit has been known. In the case of the crane including the bleed-off circuit, the amount of operation of an operation lever at which the swivel body starts swiveling fluctuates depending on a load fluctuation of the swivel body, an environmental fluctuation such as wind, or a pump flow rate of the bleed-off circuit. Thus, there is a possibility that a worker is not to be able to grasp the amount of operation of the operation lever at which the swivel body starts swiveling.

Regardless of the circuit configuration, when a working radius of the crane is large, a position of a suspended load fluctuates greatly even though the amount of swiveling of the swivel body is small. Thus, the worker needs to pay close attention to the operation of the operation lever. However, means for the worker to confirm that the swivel body is swiveling is only visual information and experience. Thus, it is not easy to grasp the swiveling of a swiveling table.

An object of the present invention is to provide an informing device, a work vehicle, and an informing method capable of notifying a worker that a swivel body is swiveling.

Solutions to Problems

An aspect of an informing device according to the present invention is an informing device mounted on a work vehicle that includes a lower base body, and a swivel body swivelably provided at the lower base body. The informing device includes a first detection unit that detects the actual amount of rotation of a drive device which swivels the swivel body or a driven part driven by the drive device, and a notification unit that issues a notification regarding information corresponding to the amount of rotation detected by the first detection unit.

An aspect of a work vehicle according to the present invention includes a lower base body, a swivel body swivelably provided at the lower base body, and the informing device.

An aspect of an informing method according to the present invention is an informing method executed by a processor mounted on a work vehicle that includes a lower base body, and a swivel body swivelably provided at the lower base body. The informing method includes a step of detecting the actual amount of rotation of a drive device which swivels the swivel body or a driven part driven by the drive device, and a step of issuing a notification of information corresponding to the detected amount of rotation.

Effects of the Invention

According to the present invention, it is possible to notify the worker that the swivel body is swiveling.

DESCRIPTION OF EMBODIMENTS

Figure 1:
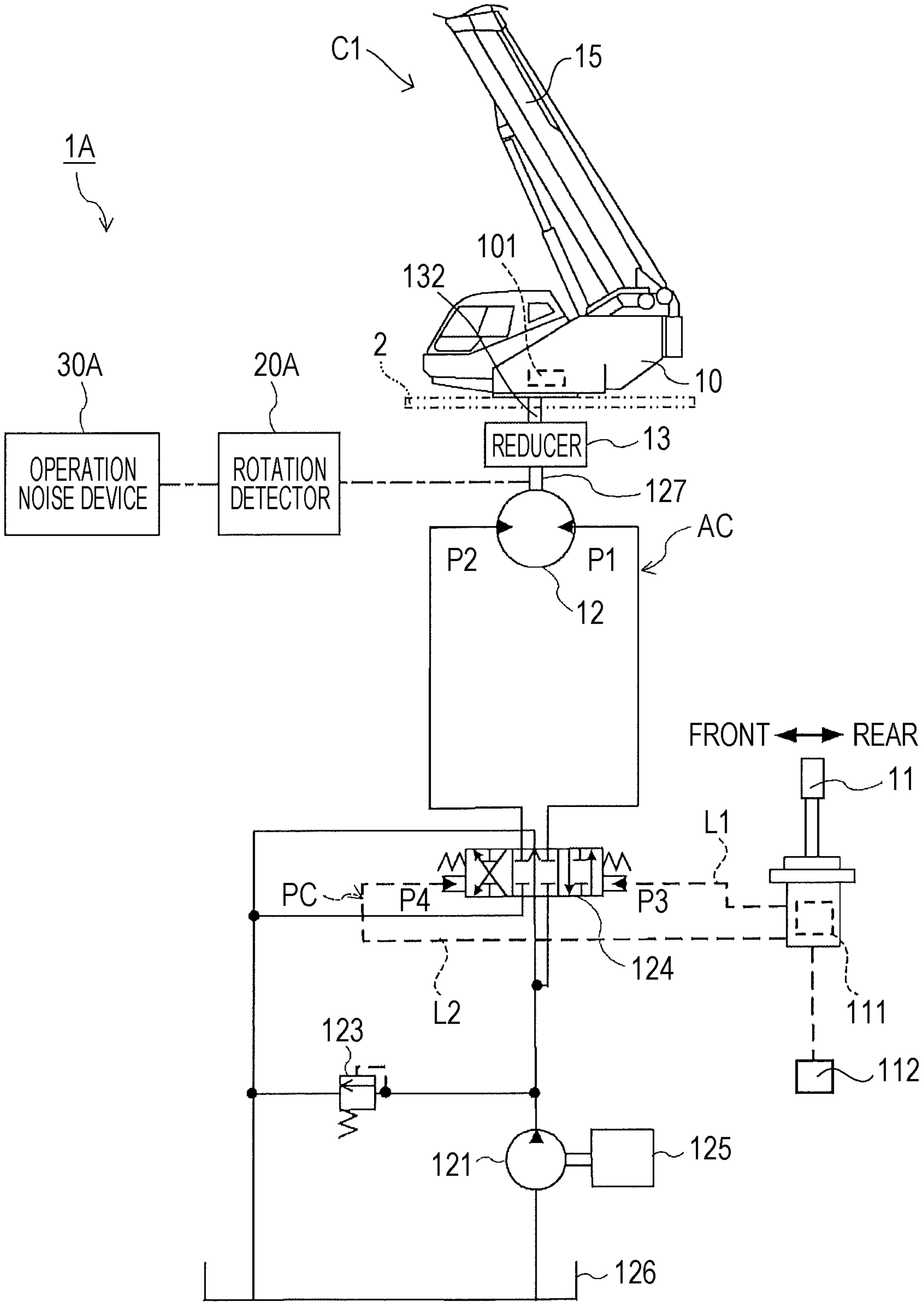
FIG. 1 is a circuit diagram of a hydraulic circuit and an electric circuit of a swivel body of a crane including a swiveling operation informing device according to a first embodiment.

Hereinafter, a swiveling operation informing device, a crane, and a swiveling operation informing method according to embodiments of the present invention will be described in detail with reference to the drawings. In the drawings, the same or equivalent parts are designated by the same reference signs. In the present description, a front-rear direction means a front-rear direction with respect to a driver's seat provided in a cabin of the crane.

First Embodiment

A swiveling operation informing device 1A of the present embodiment is a swiveling operation informing device provided at a crane C1 including a swivel body 10 provided above a lower running body (not illustrated). The crane C1 corresponds to an example of a work vehicle. When the swiveling of the swivel body 10 is detected, the swiveling operation informing device 1A of the present embodiment outputs an operation noise by the number of times corresponding to the actual amount of rotation of the swivel body 10.

First, a configuration of the crane C1 on which the swiveling operation informing device 1A is mounted will be described with reference to FIGS. 1 to 4. Next, an operation of the swiveling operation informing device 1A will be described.

In the present embodiment, the mobile crane C1 will be described as an example of the work vehicle. The mobile crane is, for example, a rough terrain crane, an all-terrain crane, a truck crane, or a vehicle-mounted truck crane (also referred to as a cargo crane). The work vehicle is not limited to the mobile crane, and may be various cranes including a lower base body and a swivel body swivelably provided at the lower base body. The lower base body may or may not be able to run. For example, various work vehicles having a swiveling function (for example, a hydraulic excavator) are used as a work vehicle other than the crane.

Figure 2:
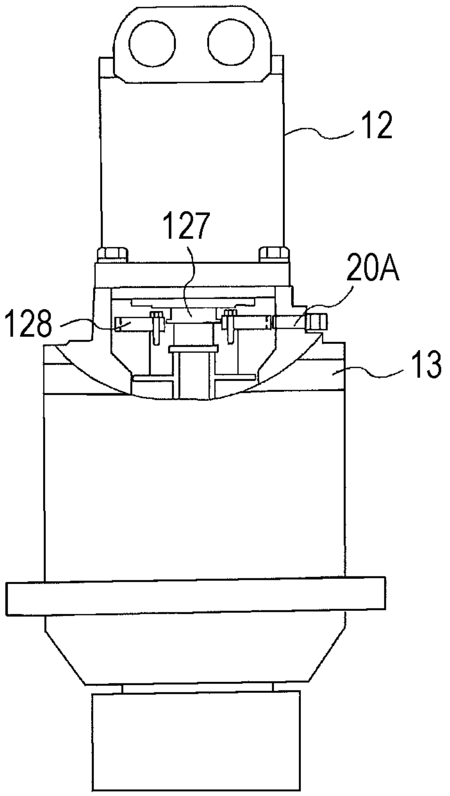
FIG. 2 is a front view of a motor included in the swivel body of the crane including the swiveling operation informing device according to the first embodiment.
Figure 3:
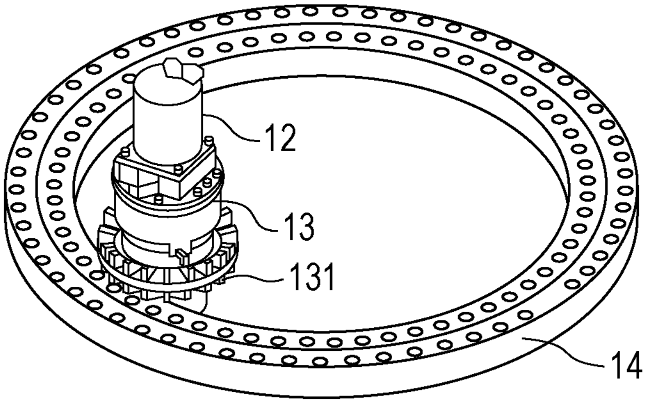
FIG. 3 is a perspective view of a motor and a swiveling bearing included in the swivel body of the crane including the swiveling operation informing device according to the first embodiment.

FIG. 1 is a circuit diagram of a hydraulic circuit and an electric circuit of the swivel body 10 included in the crane C1 at which the swiveling operation informing device 1A is provided. FIG. 2 is a front view of a motor 12 included in the swivel body 10 of the crane. FIG. 3 is a perspective view of the motor 12 and a swiveling bearing 14 included in the swivel body 10.

The crane C1 includes a lower running body 2, the swivel body 10, a boom 15, a wire rope (not illustrated), a hook (not illustrated), the swiveling operation informing device 1A, and the like.

<Lower Running Body>

The lower running body 2 corresponds to an example of the lower base body and is able to run. The lower running body 2 may be a lower running body including wheels, or may be a lower running body including crawlers. The lower base body may or may not be able to run. When the lower base body cannot run, the lower base body may be fixed to a fixed portion such as the ground or a building.

<Swivel Body>

The swivel body 10 is swivelably supported by a swiveling table (not illustrated) of the lower running body 2. The swivel body 10 includes a hydraulic circuit AC, the motor 12, a reducer 13, a swiveling brake 101, a swiveling lever 11, and the like.

<Hydraulic Circuit>

The hydraulic circuit AC has a hydraulic pump 121, a relief valve 123, a control valve 124, and the like as actuators. These actuators are provided to drive the motor 12. Such a hydraulic circuit AC corresponds to an example of a bleed-off circuit. The bleed-off circuit can improve a circuit efficiency by reducing power consumption of the actuator.

Specifically, the hydraulic pump 121 supplies hydraulic oil from an oil tank 126 to the hydraulic circuit AC by operating based on a power of a motor 125.

When the supplied hydraulic oil reaches a pressure higher than a set value, the relief valve 123 releases the hydraulic oil to the oil tank 126 by opening the valve. Accordingly, the relief valve 123 protects the hydraulic circuit AC by preventing the supplied hydraulic oil from exceeding the set pressure.

The control valve 124 switches a rotation direction of the motor 12 by switching a supply path of the hydraulic oil to the motor 12. That is, the control valve 124 selectively switches between a first path for supplying the hydraulic oil to a port P1 of the motor 12 and a second path for supplying the hydraulic oil to a port P2.

Specifically, the control valve 124 gradually narrows an oil passage (hereinafter, referred to as a bleed oil passage) that passes through the control valve 124 and returns to the tank depending on the amount of operation of the swiveling lever 11, and finally closes the oil passage. Thus, the control valve switches between the path for supplying the hydraulic oil to the port P1 of the motor 12 (first path) and the path for supplying the hydraulic oil to the port P2 of the motor 12 (second path).

When the control valve 124 switches the path for supplying hydraulic oil to the motor 12 to the first path, the motor 12 rotates in a forward rotation direction. When the control valve 124 switches the path for supplying hydraulic oil to the motor 12 to the second path, the motor 12 rotates in a reverse rotation direction.

At this time, a pressure for operating the motor 12 depends on a pressure loss caused by passing through the bleed oil passage. In the control valve 124, a relationship between the amount of operation of the swiveling lever 11 and the amount of narrowing of the oil passage is uniquely decided. On the other hand, the pressure loss caused by passing through the bleed oil passage changes depending on a flow rate of the hydraulic pump 121 which changes based on the amount of accelerator operation for swiveling. A pressure for operating the swiveling changes depending on a load such as a pose of the crane, wind, or a weight of a suspended load. Thus, the amount of operation of the swiveling lever 11 at which the swivel body 10 starts to move changes depending on the load and the amount of accelerator operation.

A pipe L1 is connected to a port P3 of the control valve 124. The pipe L1 connects the port P3 of the control valve 124 and a switching valve 111 (to be described later) of the swiveling lever 11.

A pipe L2 is connected to a port P4 of the control valve 124. The pipe L2 connects the port P4 of the control valve 124 and the switching valve 111 of the swiveling lever 11.

<Motor>

The motor 12 corresponds to an example of a swiveling motor and a drive device. The motor 12 is a hydraulic motor that rotates an output shaft by inflowing hydraulic oil. The motor 12 has the ports P1 and P2 that serve as an inlet and an outlet for hydraulic oil. The motor may be an electric motor.

The motor 12 has an output shaft 127. The output shaft 127 is connected to the reducer 13. The rotation direction of the motor 12 is switched by the control valve 124. The rotation of the motor 12 is transmitted to the reducer 13. The rotation of the motor 12 is transmitted to the swivel body 10 via the reducer 13.

When the hydraulic oil is supplied to the port P1 via the first path, such a motor 12 rotates in the forward rotation direction. When the hydraulic oil is supplied to the port P2 via the second path, the motor 12 rotates in the reverse rotation direction.

<Reducer>

The reducer 13 has a gear (not illustrated) connected to the output shaft 127 of the motor 12, an output shaft 132 (see FIG. 1) connected to the gear, a pinion gear 131 (see FIG.

3), and the like. The gear decelerates the rotation of the output shaft 127 of the motor 12 and transmits the rotation to the output shaft 132.

The pinion gear 131 is fixed to the output shaft 132. The pinion gear 131 meshes with the swiveling bearing 14 (see FIG. 3) included in the swivel body 10. The pinion gear 131 functions as a planetary gear. That is, the pinion gear 131 swivels the swiveling bearing 14 by the rotation of the output shaft 132.

When the swiveling bearing 14 rotates, the swivel body 10 swivels. When the output shaft of the reducer 13 rotates in the forward rotation direction, the pinion gear 131 swivels the swivel body 10 in a first direction (a left direction when viewed from a worker in the driver's seat). When the output shaft of the reducer 13 rotates in the reverse rotation direction, the pinion gear 131 swivels the swivel body 10 in a second direction (a right direction when viewed from the worker in the driver's seat).

<Swiveling Lever>

The swiveling lever 11 corresponds to an example of an operation lever, and can turn in the front-rear direction based on an operation of the worker. The swiveling lever 11 is operated by the worker when the worker instructs an operation of the swivel body 10. The swiveling lever 11 corresponds to an example of an operation input unit for the worker to input an instruction regarding the operation of the swivel body 10.

The swiveling lever 11 may enter any one state of an upright state (that is, a neutral state in which the swiveling lever does not tilt in the front-rear direction), a state of tilting backward (also referred to as a first state of the swiveling lever.), and a state of tilting forward (also referred to as a second state of the swiveling lever.) by being operated by the worker.

The swiveling lever 11 has the switching valve 111. The switching valve 111 switches the state of the control valve 124 based on an operation input input from the swiveling lever 11 operated by the worker.

Specifically, the switching valve 111 is connected to the port P3 of the control valve 124 via the pipe L1. The switching valve 111 is connected to the port P4 of the control valve 124 via the pipe L2. The switching valve 111 is connected to a power source 112. Pilot oil is supplied to the switching valve 111 from the power source 112.

The switching valve 111 forms a hydraulic circuit PC called a pilot circuit by being connected to the ports P3 and P4 of the control valve 124 and the power source 112.

The switching valve 111 is switched depending on the state of the swiveling lever 11. Specifically, the switching valve 111 may enter any state of a state corresponding to the neutral state of the swiveling lever 11 (also referred to as a neutral state of the switching valve), a state corresponding to the first state of the swiveling lever 11 (also referred to as a first state of the switching valve), and a state corresponding to the second state of the swiveling lever 11 (also referred to as a second state of the switching valve) depending on the state of the swiveling lever 11.

When the state of the swiveling lever 11 is switched based on the operation of the worker, the state of the switching valve 111 is switched depending on the state of the swiveling lever 11.

Specifically, the switching valve 111 is in a state in which a pressure of the pilot oil is not applied to either the port P3 or the port P4 of the control valve 124 in the neutral state of the switching valve corresponding to the neutral state of the swiveling lever 11 (also referred to as a neutral state of the control valve).

In the neutral state of the control valve, since the control valve 124 is closed, the hydraulic oil is not supplied to the motor 12. The swiveling brake 101 is provided at the swivel body 10. When the swiveling brake 101 is braking the swivel body 10, since the above-mentioned hydraulic oil is not supplied, the motor 12 does not rotate.

The switching valve 111 is in a state of applying the pilot pressure to the port P3 of the control valve 124 in the first state of the switching valve corresponding to the state in which the swiveling lever 11 tilts backward (the first state of the swiveling lever) (also referred to as a first state of the control valve).

In the first state of the control valve, the pilot pressure is not applied to port P4 of the control valve 124. In the first state of the control valve, the control valve 124 switches the path for supplying the hydraulic oil to the motor 12 to the first path (that is, the path for supplying the hydraulic oil to the port P1 of the motor 12).

In the first state of the swiveling lever, when the swiveling brake 101 is released, the motor 12 rotates in the forward rotation direction (first rotation direction). As a result, in the first state of the swiveling lever, the swivel body 10 swivels in a first swiveling direction.

The switching valve 111 is in a state of applying the pilot pressure to the port P4 of the control valve 124 in the second state of the switching valve corresponding to the state in which the swiveling lever 11 tilts forward (the second state of the swiveling lever) (also referred to as a second state of the control valve).

In the second state of the control valve, the pilot pressure is not applied to port P3 of the control valve 124. In the second state of the control valve, the control valve 124 switches the path for supplying the hydraulic oil to the motor 12 to the second path (that is, the path for supplying the hydraulic oil to the port P2 of the motor 12).

In the second state of the swiveling lever, when the swiveling brake 101 is released, the motor 12 rotates in the reverse rotation direction (second rotation direction). As a result, in the second state of the swiveling lever, the swivel body 10 swivels in a second swiveling direction.

The swivel body 10 described above swivels based on the rotation of the output shaft 132 of the reducer 13, in other words, the rotation of the output shaft 127 of the motor 12. The motor 12 is driven by the hydraulic circuit AC which is a bleed-off circuit.

Thus, when a large load is applied to the swivel body 10 and a large load is applied to the output shaft 127 of the motor 12, it becomes difficult to accurately control the motor 12. As a result, it becomes difficult to accurately operate the swivel body 10. Thus, the swiveling operation informing device 1A is provided at the swivel body 10 in order to improve operability. Next, a configuration of the swiveling operation informing device 1A will be described with reference to FIGS. 1 and 4.

<Swiveling Operation Informing Device>

Figure 4:
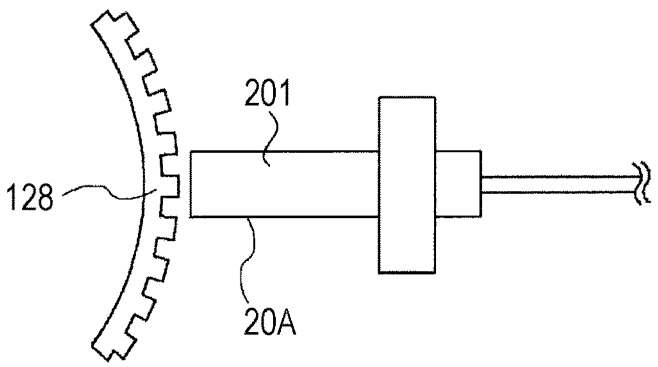
FIG. 4 is a top view of a rotation detector included in the swiveling operation informing device according to the first embodiment.

FIG. 4 is a top view of a rotation detector 20A included in the swiveling operation informing device 1A according to the first embodiment.

The swiveling operation informing device 1A includes the rotation detector 20A, an operation noise device 30A, and the like.

<Rotation Detector>

The rotation detector 20A corresponds to an example of a first detection unit, and detects the amount of rotation of the motor 12 that swivels the swivel body 10. Such a rotation detector 20A is provided at a position facing a detection gear 128 provided at the output shaft 127 of the motor 12.

The detection gear 128 has a diameter larger than that of the output shaft 127 in order to facilitate the detection of the rotation of the output shaft 127. This diameter is smaller than a diameter of the pinion gear 131. The detection gear 128 has an outer peripheral shape having a tooth tip and a tooth bottom.

The rotation detector 20A has a rotation sensor 201 facing the tooth tip or tooth bottom of the detection gear 128. The rotation sensor 201 outputs a two-phase pulse (so-called square wave with A-phase and B-phase) from the tooth tip and the tooth bottom. The rotation detector 20A detects the amount of rotation and/or the rotation direction of the detection gear 128 from the two-phase pulse of the rotation sensor 201.

When the amount of rotation of the detection gear 128 is detected, the rotation detector 20A outputs a direction signal indicating the rotation direction of the detection gear 128 (that is, the swiveling direction of the swivel body 10) for each predetermined amount of rotation to the operation noise device 30A (see FIG. 1).

Here, the predetermined amount of rotation may be set to a different amount of rotation depending on the rotation direction. When the detected rotation direction is the forward rotation direction, the rotation detector 20A outputs a first direction signal having a constant signal length for each first amount of rotation. When the rotation direction is the reverse rotation direction, the rotation detector 20A outputs a second direction signal having a signal length different from that of the first direction signal for each second amount of rotation different from the first amount of rotation.

The rotation detector 20A may have a light emitting element and a light receiving element instead of the rotation sensor, and may have a reflection type encoder that outputs a two-phase pulse from the output of the light receiving element.

The operation noise device 30A has a buzzer (not illustrated) including a diaphragm that generates sound by vibration. The operation noise device 30A vibrates the diaphragm of the buzzer based on the direction signal received from the rotation detector 20A.

Specifically, the operation noise device 30A outputs a buzzer sound having a signal length of the first direction signal or a signal length of the second direction signal depending on the first direction signal received for each first amount of rotation or the second direction signal received for each second amount of rotation.

The operation noise device 30A generates and outputs the buzzer sound for each first amount of rotation or for each second amount of rotation. That is, the operation noise device 30A generates an operation noise according to the rotation direction detected by the rotation detector 20A.

<Operation of Swiveling Operation Informing Device>

Next, an operation of the swiveling operation informing device 1A will be described. When the swiveling lever 11 tilts forward or backward by the worker, the output shaft 127 of the motor 12 rotates in a direction corresponding to a tilt direction of the swiveling lever 11 (forward rotation direction or reverse rotation direction). At this time, the output shaft 127 of the motor 12 rotates at a rotation speed corresponding to the amount of tilting of the swiveling lever 11. As a result, the detection gear 128 provided at the output shaft 127 rotates together with the output shaft 127.

When the detection gear 128 rotates in the forward rotation direction or the reverse rotation direction, the tooth tip and the tooth bottom of the detection gear 128 move relative to the rotation sensor 201 of the rotation detector 20A. As a result, the rotation sensor 201 outputs the two-phase pulse. When the detection gear 128 detects the amount of rotation, the rotation detector 20A outputs the direction signal for each predetermined amount of rotation to the operation noise device 30A based on the two-phase pulse.

When the direction signal is acquired from the rotation detector 20A, the operation noise device 30A vibrates the diaphragm of the buzzer based on the acquired direction signal. Since the direction signal is the first direction signal or the second direction signal corresponding to the rotation direction detected by the rotation detector 20A, the operation noise device 30A outputs the operation noise (buzzer sound) corresponding to the rotation direction of the swivel body 10. The operation noise (buzzer sound) output by the operation noise device 30A corresponds to an example of information issued by a notification unit. The operation noise (buzzer sound) output by the operation noise device 30A may be regarded as information corresponding to the actual amount of rotation of the swivel body 10.

It is preferable that the worker knows in advance that the operation noise (buzzer sound) corresponding to the rotation direction of the motor 12, that is, the swiveling direction of the swivel body 10 is output and the operation noise (buzzer sound) is output by the number of times proportional to the amount of rotation. Accordingly, the worker can recognize a magnitude of a swiveling speed of the swivel body 10 from the number of times of the buzzer sound.

As a result, the worker can easily recognize a swiveling operation of the swivel body 10 from the number of times of the buzzer sound even in a situation in which the swivel body 10 cannot be visually and physically recognized as being slightly moving. Accordingly, the operability of the swivel body 10 is improved.

As described above, in the swiveling operation informing device 1A according to the first embodiment, the operation noise device 30A issues a notification regarding the swiveling of the swivel body 10 based on the amount of rotation detected by the rotation detector 20A. Since the amount of rotation detected by the rotation detector 20A is the amount of rotation of the motor 12 that swivels the swivel body 10, the swiveling operation informing device 1A detects the swiveling and can notify the worker even when the swivel body 10 slightly swivels.

The operation noise device 30A outputs the operation noised corresponding to the rotation direction detected by the rotation detector 20A. Thus, the worker can easily recognize the swiveling direction of the swivel body 10. Since the operation noise is the buzzer sound produced for each predetermined amount of rotation based on the amount of rotation detected by the rotation detector 20A, the worker can easily recognize the magnitude of the swiveling speed of the swivel body 10 from the number of times of the buzzer sound. As a result, the operability of the swivel body 10 is improved.

The rotation detector 20A detects the amount of rotation of the motor 12 instead of the amount of rotation of the reducer 13. The amount of rotation of the motor 12 is the amount of rotation before being decelerated by the reducer 13. The amount of rotation of the motor 12 is proportional to the swiveling speed of the swivel body 10. Thus, the swiveling operation informing device 1A can detect the swiveling operation of the swivel body 10 with high accuracy.

Second Embodiment

A swiveling operation informing device 1B according to a second embodiment will be described with reference to FIGS. 5 to 7. The swiveling operation informing device 1B of the present embodiment includes a controller 50 that determines whether or not the swiveling of the swivel body 10 is operated according to the operation of the swiveling lever 11. In the following description of the swiveling operation informing device 1B, the description of the same configurations as those of the swiveling operation informing device 1A of the first embodiment described above will be omitted. Further, among the configurations of the swiveling operation informing device 1B, the same reference signs as those of the swiveling operation informing device 1A are given to the configurations common to the swiveling operation informing device 1A.

Figure 5:
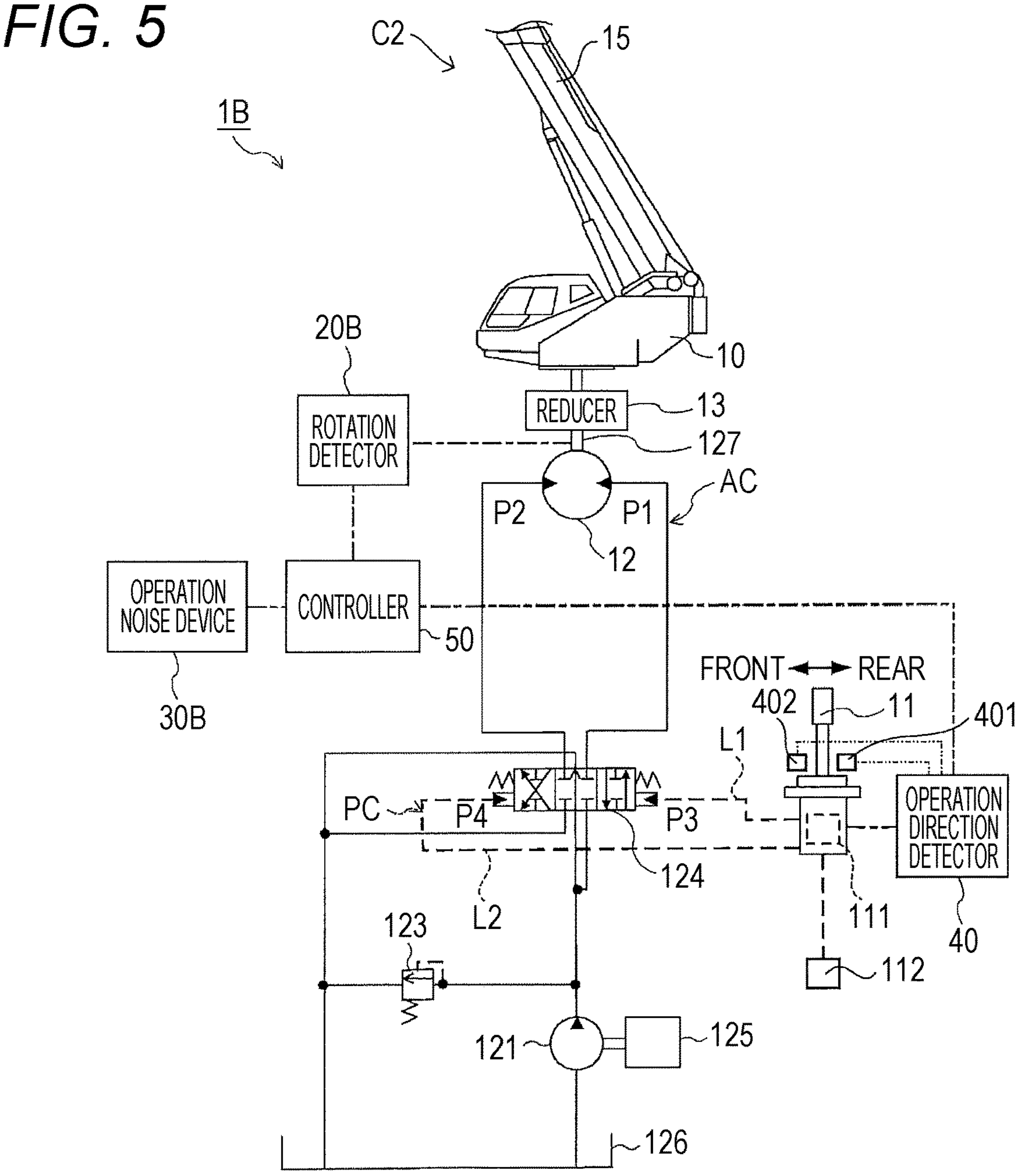
FIG. 5 is a circuit diagram of a hydraulic circuit and an electric circuit of a swivel body of a crane including a swiveling operation informing device according to a second embodiment.

FIG. 5 is a circuit diagram of the hydraulic circuit and the electric circuit of the swivel body 10 of a crane C2 at which the swiveling operation informing device 1B is provided according to the second embodiment.

As illustrated in FIG. 5, the swiveling operation informing device 1B includes a rotation detector 20B, an operation direction detector 40, a controller 50, an operation noise device 30B, and the like.

<Rotation Detector>

The rotation detector 20B has the rotation sensor 201 (see FIG. 4) that outputs the two-phase pulse, similarly to the rotation detector 20A of the first embodiment.

The rotation detector 20B detects the actual amount of rotation and/or the actual rotation direction of the detection gear 128 of the motor 12 based on the output of the rotation sensor 201. The rotation detector 20B may detect the actual amount of rotation and/or an actual rotation direction of a driven member driven by the motor 12. In the case of the present embodiment, the reducer 13, the swiveling bearing 14, the swivel body 10, and the like correspond to an example of a driven part.

The rotation detector 20B outputs information regarding the detected amount of rotation (also referred to as rotation amount data) and/or information regarding the rotation direction (also referred to as rotation direction data) to the controller 50. Here, the information regarding the rotation direction (rotation direction data) may be regarded as information indicating any of "forward rotation direction", "reverse rotation direction", and "no direction". A case where the information regarding the rotation direction indicates "no direction" may be regarded as a state the rotation detector 20B does not detect the rotation. That is, when the information regarding the rotation direction is "no direction", the swivel body 10 may be regarded as stopped.

<Operation Direction Detector>

The operation direction detector 40 corresponds to an example of a second detection unit, and detects information regarding an operation input for instructing the rotation direction of the motor 12 that rotates the swivel body 10. In the case of the present embodiment, the operation input is input by the worker operating the swiveling lever 11. In the case of the present embodiment, the information regarding the operation input is an operation direction of the swiveling lever 11.

That is, the operation direction detector 40 detects the operation direction of the swiveling lever 11 which is the information regarding the operation input. The operation direction detector 40 has two limit switches 401 and 402.

The limit switch 401 detects the state in which the swiveling lever 11 tilts backward (the first state of the swiveling lever). When the first state of the swiveling lever is detected, the limit switch 401 outputs a detection signal (for example, an electric signal) to the operation direction detector 40.

The limit switch 402 detects the state in which the swiveling lever 11 tilts forward (the second state of the swiveling lever). When the second state of the swiveling lever is detected, the limit switch 402 outputs a detection signal (for example, an electric signal) to the operation direction detector 40.

When the limit switches 401 and 402 do not output the detection signals, the swiveling lever 11 may be regarded as being in the neutral state. The operation direction detector 40 detects the operation direction of the swiveling lever 11 based on the detection signals of the limit switches 401 and 402.

The operation direction detector 40 outputs the information regarding the detected operation direction of the swiveling lever 11 to the controller 50. Here, the information regarding the operation direction means information regarding the operation direction (tilt direction) of the swiveling lever 11 from the neutral state of the swiveling lever 11.

That is, the information regarding the operation direction may be regarded as information indicating that the operation direction of the swiveling lever 11 is any of "forward", "rearward", and "no direction". The operation direction detector 40 may be a pressure switch or a potentiometer instead of the limit switch. The pressure switch is a sensor that detects the pilot pressures of the pipe L1 and the pipe L2. The potentiometer is a sensor that detects a lever operation angle of the swiveling lever 11.

The information regarding the operation input is not limited to the operation direction of the swiveling lever 11. The information regarding the operation input may be various kinds of information corresponding to the operation input (operation of the swiveling lever 11) for instructing the rotation direction of the motor 12.

For example, the information regarding the operation input may be the pressures of the pipe L1 and the pipe L2 (that is, the pilot pressures). The information regarding the operation input may be the information regarding the state of the switching valve 111 and/or the control valve 124.

The operation input unit for inputting the operation input is not limited to the swiveling lever 11. The operation input unit may be, for example, a button-type switch (not illustrated) or a touch panel provided in the driver's seat of the work vehicle (for example, the crane). The worker may input an operation input for instructing the operation of the swivel body 10 (rotation direction of the motor 12) by operating the switch.

The operation input is not limited to the input based on the operation of the swiveling lever 11 by the worker. For example, the operation input may be an input based on the operation of the button by the worker.

The operation input may be an operation signal for controlling (instructing) the operation of the swivel body 10 (the rotation direction of the motor 12) received from a remote operation terminal for remotely controlling the crane C2.

The operation input is, for example, an operation signal for controlling (instructing) the operation of the swivel body 10 (the rotation direction of the motor 12) of the swivel body 10 acquired from an external terminal in which an application such as building information modeling (BIM) is incorporated via a network (for example, the Internet).

The operation input may be an operation signal for controlling (instructing) the operation of the swivel body 10 (the rotation direction of the motor 12) of the swivel body 10 received from an external terminal such as a server via a network (for example, the Internet).

The operation input is not limited to the operation input input by the worker via the operation input unit. That is, in an automatic driving of the crane C2, an operation signal for automatically controlling the operation of the swivel body 10 may also be regarded as an example of the operation input.

<Controller>

The controller 50 is an example of a determination unit, and determines whether or not the rotation direction of the motor 12 instructed by the operation of the swiveling lever 11 coincides with the actual rotation direction of the motor 12 based on a detection value of the operation direction detector 40 and a detection value of the rotation detector 20B. The controller 50 controls the operation of the operation noise device 30B based on the determination result.

In the case of the present embodiment, the controller 50 acquires the outputs (detection values) of the operation direction detector 40 and the rotation detector 20B. The controller 50 is achieved by a central processing unit (CPU) executing a swiveling direction informing program.

The controller 50 acquires the information regarding the rotation direction acquired from the rotation detector 20B and the information regarding the operation direction acquired from the operation direction detector 40. The controller 50 compares the information regarding the rotation direction acquired from the rotation detector 20B with the information regarding the operation direction acquired from the operation direction detector 40, and determines whether or not the actual rotation direction of the motor 12 (may be the actual rotation direction of the detection gear 128) corresponds to the operation direction of the swiveling lever 11. Since the actual rotation direction of the motor 12 corresponds to the actual rotation direction of the swivel body 10, the controller 50 may be regarded as determining whether or not the actual rotation direction of the swivel body 10 corresponds to the operation direction of the swiveling lever 11. The controller 50 outputs the determination result.

Specifically, when it is determined that the actual rotation direction of the motor 12 does not correspond to the operation direction of the swiveling lever 11, the controller 50 outputs a first operation noise signal having a constant pulse width, that is, a constant signal length to the operation noise device 30B.

On the other hand, when it is determined that the actual rotation direction of the motor 12 corresponds to the operation direction of the swiveling lever 11, the controller 50 outputs a second operation noise signal having a signal length different from that of the first operation noise signal to the operation noise device 30B.

The controller 50 outputs the first operation noise signal or the second operation noise signal by the number of times corresponding to the information regarding the amount of rotation received from the rotation detector 20B (also referred to as rotation amount data), in other words, for each predetermined amount of rotation. In the present specification, the first operation noise signal or the second operation noise signal corresponds to an example of a direction signal.

<Operation Noise Device>

The operation noise device 30B corresponds to an example of a notification device, and outputs the operation noise based on the output of the controller 50. Specifically, the operation noise device 30B receives the first operation noise signal or the second operation noise signal from the controller 50. The operation noise device 30B outputs a first operation noise based on the first operation noise signal received from the controller 50. The operation noise device 30B outputs a second operation noise based on the second operation noise signal received from the controller 50.

When the first operation noise signal is received, the operation noise device 30B vibrates the diaphragm to generate the first operation noise constituted by the buzzer sound corresponding to the signal length of the first operation noise signal. When the second operation noise signal is received, the operation noise device 30B generates the second operation noise constituted by the buzzer sound corresponding to the signal length of the second operation noise signal.

The signal lengths of the first operation noise signal and the second operation noise signal are different. A length of the buzzer sound constituting the first operation noise and a length of the buzzer sound constituting the second operation noise are different. The first operation noise and the second operation noise may be regarded as having different numbers of times of output and/or sound properties (sound lengths and/or sound pitches, and the like).

The worker can recognize whether or not the motor 12 is rotating in the direction as operated by the swiveling lever 11, that is, the swivel body 10 is swiveling in the direction as operated by the swiveling lever 11 from a difference in the length of the buzzer sound between the first operation noise and the second operation noise.

The first operation noise and the second operation noise correspond to an example of a notification sound. The first operation noise corresponds to an example of first notification information. The second operation noise corresponds to an example of second notification information. Means for notifying the worker of the first operation noise is referred to as first notification means. Means for notifying the worker of the second operation noise is referred to as second notification means.

The controller 50 outputs the first operation noise signal or the second operation noise signal to the operation noise device 30B whenever the motor 12 rotates by a predetermined amount of rotation. Thus, the first operation noise and the second operation noise are output for each predetermined amount of rotation of the motor 12.

In other words, the operation noise (buzzer sound) is produced by the number of times corresponding to the swiveling speed of the swivel body 10. Such an operation noise device 30B notifies the worker of a degree of the amount of rotation of the motor 12 by outputting the operation noise whenever the motor 12 rotates by a predetermined amount of rotation. Since the amount of rotation of the motor 12 is proportional to the amount of rotation of the swivel body 10, the worker can recognize the magnitude of the amount of rotation of the swivel body 10 from the number of times of the operation noise of the operation noise device 30B.

Operation Example of Swiveling Operation Informing Device

Next, an operation of the swiveling operation informing device 1B will be described with reference to FIGS. 6 and 7. In the following description, it is assumed that the crane is in a state of stopping running (also referred to as a running stopping state of the crane) and is in a state of performing a work (also referred to as a working state of the crane).

Figures 6, 7:
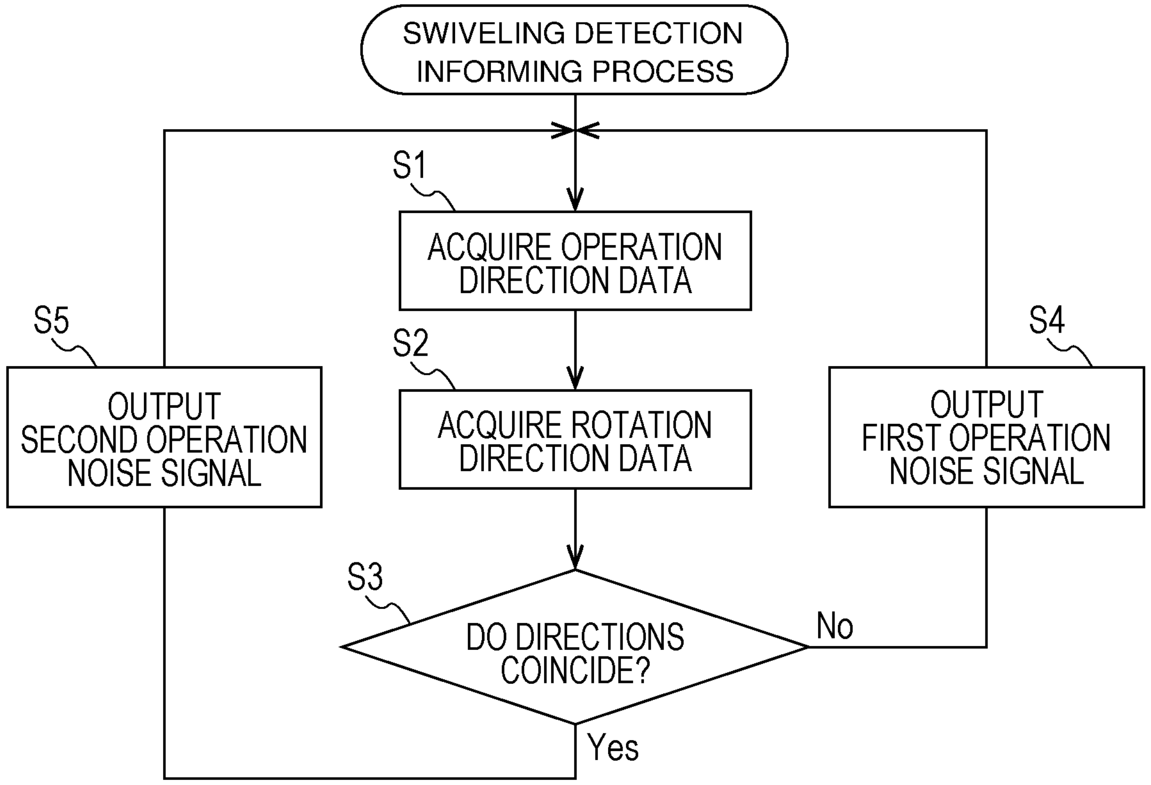
FIG. 6 is a flowchart of a swiveling direction informing process of the swiveling operation informing device according to the second embodiment.
FIG. 7 is a diagram of a swiveling direction table stored in a storage unit inside a controller included in the swiveling operation informing device according to the second embodiment.

FIG. 6 is a flowchart of a swiveling direction informing process of the swiveling operation informing device 1B according to the second embodiment. FIG. 7 is a diagram of a swiveling direction table 41 stored in an internal storage unit of the controller 50 included in the swiveling operation informing device 1B.

In the swiveling operation informing device 1B, the execution of the swiveling direction informing program is started when a PTO switch is turned on. As a result, the swiveling direction informing process illustrated in FIG. 6 is started. The swiveling direction informing process may be regarded as being executed by a processor mounted on the crane C2.

First, the controller 50 acquires operation direction data from the operation direction detector 40 (step S1).

In this operation example, when the swiveling lever 11 is operated forward, the controller 50 acquires the information regarding the operation direction indicating "forward" from the operation direction detector 40. When the swiveling lever 11 is operated backward, the controller 50 acquires the information regarding the operation direction indicating "rear" from the operation direction detector 40. When the swiveling lever 11 is in the neutral state, the controller 50 acquires the information regarding the operation direction indicating "no direction" from the operation direction detector 40.

Subsequently, the controller 50 acquires the information regarding the rotation direction (also referred to as rotation direction data) from the rotation detector 20B (step S2).

When the detection gear 128 of the motor 12 is rotating in the forward rotation direction (also referred to as a first rotation direction), the controller 50 acquires the information regarding the rotation direction indicating the "forward rotation direction" from the rotation detector 20B.

When the detection gear 128 is rotating in the reverse rotation direction (also referred to as a second rotation direction), the controller 50 acquires the information regarding the rotation direction indicating the "reverse rotation direction" from the rotation detector 20B.

When the detection gear 128 is not rotating, the controller 50 acquires the information regarding the rotation direction indicating "no direction" from the rotation detector 20B.

The controller 50 may acquire the information regarding the rotation amount (also referred to as the rotation amount data) from the rotation detector 20B. In the present description, a process of detecting the rotation of the reducer 13 by the rotation detector 20B is referred to as a rotation detection process.

Subsequently, the controller 50 compares the information regarding the rotation direction acquired from the rotation detector 20B with the information regarding the operation direction acquired from the operation direction detector 40. At this time, the controller 50 reads out the swiveling direction table 41 illustrated in FIG. 7 from the storage unit. The swiveling direction table 41 stores the information regarding the operation direction (also referred to as operation direction data) in association with a direction in which the motor 12 is to rotate.

The controller compares the actual rotation direction of the motor 12 indicated by the information regarding the rotation direction acquired from the rotation detector 20B with the direction in which the motor 12 is to rotate acquired from the swiveling direction table 41, and determines whether or not these directions coincide as illustrated in FIG. 6 (step S3).

When the actual rotation direction of the motor 12 indicated by the information regarding the rotation direction does not coincide with the direction in which the motor 12 is to rotate acquired from the swiveling direction table 41 ("No" in step S3), the controller 50 determines that the swivel body 10 swivels in a direction different from the operation of the swiveling lever 11. In the present description, the process performed in step S3 is referred to as a determination process.

The controller 50 outputs the first operation noise signal having a constant signal length to the operation noise device 30B (step S4). This first operation noise signal is output for each predetermined rotation amount based on the information regarding the amount of rotation acquired from the rotation detector 20B. Accordingly, the operation noise device 30B outputs the first operation noise by the number of times corresponding to the amount of rotation of the motor 12. That is, the operation noise device 30B generates the first operation noise constituted by the buzzer sound produced whenever the first operation noise signal is received.

It is preferable that the worker knows the following (1) to (4) in advance.

(1) Two types of sounds (first operation noise or second operation noise) having different lengths of buzzer sounds are output from the operation noise device 30B.

(2) The first operation noise notifies that the swivel body 10 is swiveling in the direction different from the operation of the swiveling lever 11.

(3) The second operation noise notifies that the swivel body 10 is swiveling in the direction corresponding to the operation of the swiveling lever 11.

(4) The number of times each of the first operation noise and the second operation noise are output corresponds to the number of times corresponding to the swiveling speed of the swivel body 10.

In step S4, the worker can recognize that the swivel body 10 is rotating in the direction different from the operation of the swiveling lever 11 by hearing the first operation noise.

Subsequently, the controller 50 returns the swiveling direction informing process to step S1 while continuing to output the first operation noise signal (step S4). The output of the first operation noise signal is returned to step S1, and then the processes of steps S1 to S3 are continued. This process is similarly performed when the second operation noise signal of step S5 to be described later is output.

On the other hand, when the actual rotation direction of the motor 12 indicated by the information regarding the rotation direction coincides with the direction in which the motor 12 is to rotate acquired from the swiveling direction table 41 ("Yes" in step S3), the controller 50 determines that the swivel bodyswivel body 10 is swiveling in the direction coinciding with the operation of the swiveling lever 11.

Subsequently, the controller 50 outputs the second operation noise signal having a signal length shorter than that of the first operation noise signal to the operation noise device 30B by the number of times based on the rotation amount data (step S5).

Accordingly, the operation noise device 30B outputs the second operation noise constituted by the buzzer sound. As a result, the worker recognizes that the swivel body 10 is swiveling in the direction coinciding with the operation of the swiveling lever 11. Subsequently, the controller 50 returns the swiveling direction informing process to step S1.

The swiveling direction informing process is performed until the swiveling brake 101 is switched to an ON state. Thus, while the swiveling brake 101 is in an OFF state, the controller 50 repeats the processes of steps S1 to S3 described above.

As a result, while the switch of the swiveling brake 101 is turned off, the controller 50 constantly compares the information regarding the operation direction (operation direction data) with the information regarding the rotation direction (operation direction data), and notifies the worker of the comparison result by the buzzer sound output by the operation noise device 30B. On the other hand, the swiveling direction informing process is ended when the switch of the swiveling brake 101 is turned on.

In step S5, the swiveling speed of the swivel body 10 may be calculated based on the information regarding the amount of rotation (rotation amount data) acquired by the controller 50. In this case, the controller 50 may clock a time from when the previous rotation amount data is acquired to when the next rotation amount data is acquired, and may calculate the swiveling speed of the swivel body 10 from the clocked time and a fluctuation value of the amount of rotation.

When the calculated swiveling speed is a speed larger than a predetermined value, the second operation noise may be interrupted by stopping the output of the second operation noise signal in step S5. The above-mentioned predetermined value is set to be larger than the swiveling speed when the swivel body 10 slightly moves, and thus, only the slight swiveling of the swivel body 10 can be notified to the worker.

In other words, in step S3, the controller 50 may determine that the actual rotation direction of the motor 12 indicated by the information regarding the rotation direction coincides with the direction in which the motor 12 is to rotate acquired from the swiveling direction table 41, and may output the second operation noise signal in step S5 when the swiveling speed of the swivel body 10 satisfies a predetermined condition (for example, when the swiveling speed is equal to or less than the predetermined value).

In other words, in step S3, even though it is determined that the actual rotation direction of the motor 12 indicated by the information regarding the rotation direction coincides with the direction in which the motor 12 is to rotate acquired from the swiveling direction table 41, when the swiveling speed of the swivel body 10 does not satisfy the predetermined condition (for example, when the swiveling speed is larger than the predetermined value), the controller 50 may not output the second operation noise signal in step S5 (that is, step S5 may be omitted).

As described above, in the swiveling operation informing device 1B according to the second embodiment, the controller 50 determines whether or not the motor 12 is rotating in the same direction as the operation direction of the swiveling lever 11 based on the rotation direction of the detection gear 128 of the motor 12 detected by the rotation detector 20B and the operation direction of the swiveling lever 11 detected by the operation direction detector 40.

The operation noise device 30B outputs the first operation noise or the second operation noise based on the determination result of the controller 50. Accordingly, the worker can recognize whether or not the swivel body 10 is swiveling as operated by the swiveling lever 11 by the type of the sound. Thus, the worker can operate the swiveling lever 11 after recognizing the actual swiveling direction of the swivel body 10. Accordingly, the swiveling operation informing device 1B can improve the operability of the swivel body 10.

Since the rotation detector 20B detects the rotation of the motor 12 before being decelerated by the reducer 13, the swiveling operation of the swivel body 10 can be detected with high accuracy as in the first embodiment.

Since the operation noise device 30B produces the buzzer sound for each predetermined amount of swiveling based on the amount of rotation of the motor 12, the worker can easily recognize the magnitude of the swiveling speed of the swivel body 10 from the number of times of the buzzer sound as in the first embodiment.

Although the embodiments of the present invention have been described above, the present invention is not limited to the above-described embodiments. In the first and second embodiments, the operation noise devices 30A and 30B notify the work vehicle of the swiveling of the swivel body 10 by outputting the sound.

However, the present invention is not limited thereto. In the present invention, it is only required that the swiveling operation informing devices 1A and 1B include the notification device that notifies the worker of the swiveling of the swivel body 10. In the present invention, the notification device includes any notification means. Thus, the operation noise devices 30A and 30B may be replaced with a light emitting device (for example, a lamp or a liquid crystal display device) that notifies the worker by light emission. In this case, the light emitting device may blink by the number of times for each predetermined amount of rotation based on the amount of rotation detected by the rotation detectors 20A and 20B.

The swiveling operation informing device may notify the worker of the swiveling direction of the swivel body 10 by changing a lighting time of the light emitting device. When the notification device is the light emitting device, the information notified by the notification device is light. When the information notified by the notification device is light, the first notification information and the second notification information notified by the notification device may have different number of times of blinking of the light. The information notified by the notification device may be the vibration of the swiveling lever 11. When the information notified by the notification device is the vibration of the swiveling lever 11, the first notification information and the second notification information notified by the notification device may have different numbers of times of vibration.

The notification device of the present invention may have an on and off function of the notification means and a notification means adjustment function (for example, volume adjustment of the operation noise, lighting time adjustment of the light emitting device, and the like). The notification device may have a function for the worker to set the amount of rotation to be notified and the amount of rotation or the speed for stopping the notification (for example, mute) and to adjust the set value thereof to any amount. The notification device may have a function of issuing the notification only when the amount of rotation exceeds or falls below a certain threshold value, and a function of changing the number of times (frequency) of issuing the notification for each amount of rotation.

The operation noise devices 30A and 30B may be replaced with a vibration generation device provided at the swiveling lever 11 and notifying the worker. In this case, the vibration generation device may vibrate by the constant number of times for each predetermined amount of rotation based on the rotation amount data detected by the rotation detectors 20A and 20B. The vibration generation device may vibrate by the number of times of vibrations corresponding to the amount of rotation. The vibration generation device may notify the worker of the swiveling direction of the swivel body 10 by changing the intensity of the vibration.

In the first and second embodiments, the operation noise devices 30A and 30B generate the operation noise corresponding to the rotation direction of the motor 12. However, in the present invention, it is only required that the operation noise devices 30A and 30B issue the notification regarding the swiveling of the swivel body 10 for each predetermined amount of rotation based on the amount of rotation of the motor 12, and whether or not the operation noise devices 30A and 30B generate the operation noise corresponding to the rotation direction of the motor 12, that is, the swiveling direction of the swivel body 10 is optionally determined. Accordingly, the same buzzer sound may be produced regardless of whether the swivel body 10 swivels right or left. In this case, the buzzer sound may be produced for each predetermined amount of rotation.

Although the swiveling operation informing devices 1A and 1B provided at the crane have been described in the first and second embodiments, the present invention can be applied to all construction machines including the swivel body 10 provided above the lower running body. For example, the present invention can be applied to cranes such as a rough terrain crane and a truck crane, and an aerial work vehicle.

The disclosure of Japanese Patent Application No. 2018-138950 filed on Jul. 25, 2018 including the specification, drawings and abstract is incorporated herein by reference in its entirety.

INDUSTRIAL APPLICABILITY

The informing device, the work vehicle, and the informing method according to the present invention can be applied not only to the crane but also to various work vehicles.

REFERENCE SIGNS LIST

1A, 1B Swiveling operation informing device
2 Lower running body
10 Swivel body
101 Swiveling brake
11 Swiveling lever
111 Switching valve
112 Power source
12 Motor (swiveling motor)
13 Reducer
14 Swiveling bearing
15 boom
20A, 20B Rotation detector
201 Rotation sensor
30A, 30B Operation noise device
40 Operation direction detector
401, 402 Limit switch
41 Swiveling direction table
50 Controller
121 Hydraulic pump
123 Relief valve
124 Control valve
125 Motor
126 Oil tank
107 Output shaft
108 Detection gear
131 Pinion gear
132 Output shaft
P1, P2, P3, P4 port
AC, PC Hydraulic circuit
C1, C2 Crane

The invention claimed is:

1. An informing device mounted on a work vehicle that includes a lower base body, and a swivel body swivelably provided at the lower base body, the informing device comprising:

a first detection unit configured to detect an actual amount of rotation and an actual direction of rotation of a drive device which swivels the swivel body or a driven part driven by the drive device;

a second detection unit configured to detect information regarding an operation input for instructing a rotation direction of the swivel body;

a determination unit configured to determine, based on a detection value of the first detection unit and a detection value of the second detection unit, whether or not the rotation direction instructed by the operation input corresponds to the direction of rotation detected by the first detection unit; and a notification unit configured to issue a notification regarding information corresponding to the amount of rotation detected by the first detection unit, issue a notification regarding information corresponding to the direction of rotation detected by the first detection unit, issue a first operation noise when the rotation direction instructed by the operation input does not correspond to the direction of rotation detected by the first detection unit, and issue a second operation noise, which is different from the first operation noise, when the rotation direction instructed by the operation input corresponds to the direction of rotation detected by the first detection unit, wherein the first detection unit, the second detection unit, the determination unit, and the notification unit are each implemented via at least one processor.

2. The informing device according to claim 1, wherein the notification unit is further configured to issue the notification regarding the information corresponding to the amount of rotation detected by the first detection unit when the amount of rotation detected by the first detection unit satisfies a predetermined condition.

3. The informing device according to claim 2, wherein the notification unit is further configured to issue the notification regarding the information corresponding to the amount of rotation detected by the first detection unit when the amount of rotation detected by the first detection unit corresponds to a predetermined amount of rotation.

4. The informing device according to claim 1, wherein the work vehicle further comprises a reducer that is provided between the drive device and the swivel body and reduces the rotation of the drive device to transmit the rotation to the swivel body, and the amount of rotation detected by the first detection unit is the amount of rotation of the drive device before being reduced by the reducer.

5. The informing device according to claim 1, wherein the first operation noise and the second operation noise have different sound properties.

6. The informing device according to claim 5, wherein the first operation noise and the second operation noise have different properties of at least one of a number of times of sound and a sound pitch.

7. A work vehicle comprising:

a lower base body;

a swivel body swivelably provided at the lower base body; and the informing device according to claim 1.

8. An informing method executed by a processor mounted on a work vehicle that includes a lower base body, and a swivel body swivelably provided at the lower base body, the informing method comprising:

detecting an actual amount of rotation and an actual direction of rotation of a drive device which swivels the swivel body or a driven part driven by the drive device;

detecting information regarding an operation input for instructing a rotation direction of the swivel body;

determining whether or not the rotation direction instructed by the operation input corresponds to the detected actual direction of rotation;

issuing a notification of information corresponding to the detected amount of rotation;

issuing information corresponding to the detected direction of rotation;

issuing a first operation noise when the rotation direction instructed by the operation input does not correspond to the detected actual direction of rotation; and issuing a second operation noise, which is different from the first operation noise, when the rotation direction instructed by the operation input corresponds to the detected actual direction of rotation.

* * * * *